May 4, 1965 P. J. HEISTER 3,181,377
PULSATING TORQUE CONVERTER
Filed July 10, 1963 3 Sheets-Sheet 1

INVENTOR.
PAUL J. HEISTER
BY *Otto John Munz*
ATTORNEY

May 4, 1965 P. J. HEISTER 3,181,377
PULSATING TORQUE CONVERTER
Filed July 10, 1963 3 Sheets-Sheet 2
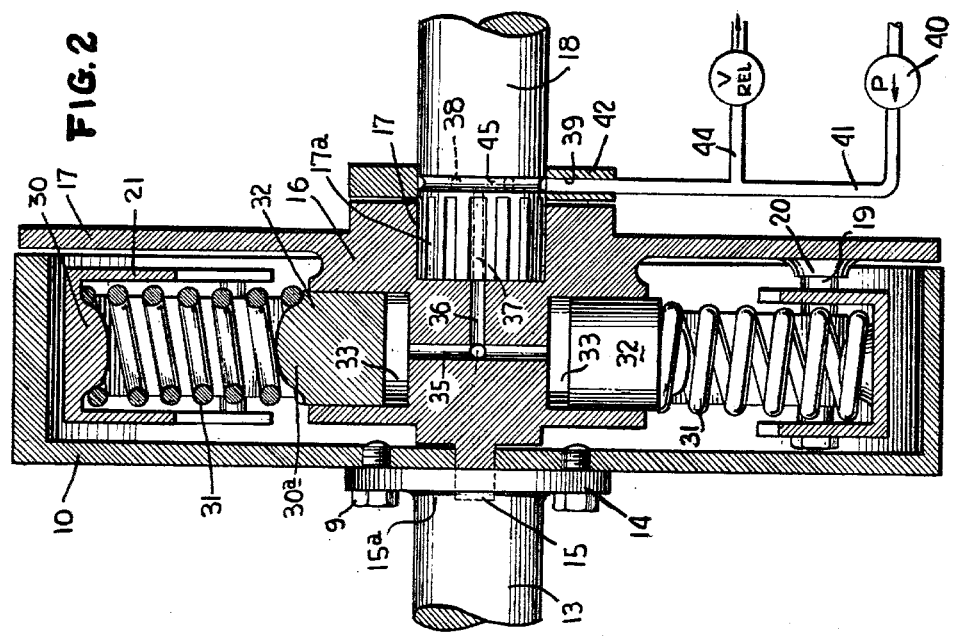
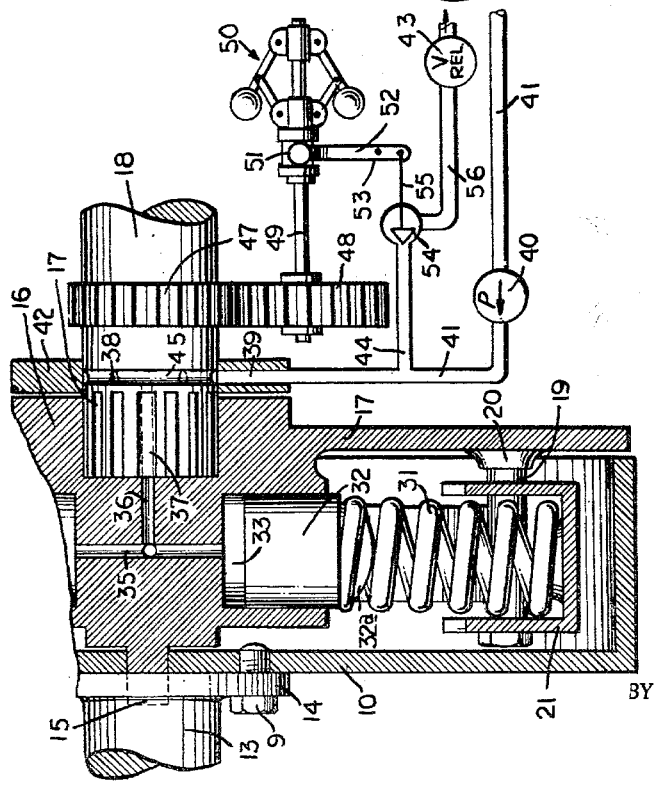
INVENTOR.
PAUL J. HEISTER
BY
ATTORNEY May 4, 1965  P. J. HEISTER  3,181,377
PULSATING TORQUE CONVERTER
Filed July 10, 1963  3 Sheets-Sheet 3

INVENTOR.
PAUL J. HEISTER
BY
ATTORNEY

United States Patent Office 3,181,377
Patented May 4, 1965

3,181,377
PULSATING TORQUE CONVERTER
Paul Johnson Heister, Oxford, Md., assignor of one-half to Claire C. Heister
Filed July 10, 1963, Ser. No. 293,964
11 Claims. (Cl. 74—64)

This invention relates to torque converters and more particularly to a mechanical type of converter for connecting a prime mover directly to a load to be driven thereby, without the use of reduction gearing, slip friction clutches, and the like.

It is the chief object of the invention to provide a mechanical drive of the aforesaid type which automatically increases the transmitted torque with increase in rotational speed of a driven element or shaft.

Another object is to provide a converter wherein the automatic increase of torque may be augmented by hydraulic pressure fluid means under manual and/or means automatically responsive to rotational speed of a driven shaft or other driven part.

Yet another object is to provide an impositive, slip-friction connection between a driving and a driven part which is relatively simple and inexpensive to construct and assemble, inherently reliable in operation, of indefinite useful life and easily serviced, repaired and replaced as desired or required.

The foregoing and other objects and advantages are attained by a cup-like driving element having an axis of rotation and a cam surface formed upon the skirt or rim portion of the element, which cam surface is generated by rotating, at constant speed, a line of fixed length constantly parallel with and radially offset from said axis, while gradually increasing and then decreasing the radial distance of the line from the axis through a number of equiangular cycles such as three, for each 360° of rotation of the line about the axis. The driven element is provided with a number of rollers different from the number of aforesaid cycles, four for example. Each roller is journalled for rotation and is connected for rotation as a unit with the driven shaft or element, but is mounted to be moved radially of the shaft and yieldably urged by variable force into contact with the aforesaid cam surface. The force is varied by the centrifugal force inherently acting upon each roller as it revolves about the common axis, supplemented by spring forces which may be varied manually and/or automatically in response to speed of rotation of one of the aforesaid elements. On starting up the rollers at first simply roll along in contact with the cam surface but for each rotation of the driving shaft, the cam surface imparts impulses to each roller equal to the number of cycles of the cam surface so that, where there are three cycles and four rollers, a total of twelve impulses will be imparted to the driven shaft when at rest, for each complete rotation of the driving shaft and its cam surface.

In the drawings:

FIGURE 2 is a vertical section in a plane identified by line 2—2, FIGURE 1;

FIGURE 3 is a partial sectional view of a form of the invention embodying an automatic speed control;

Figure 1:
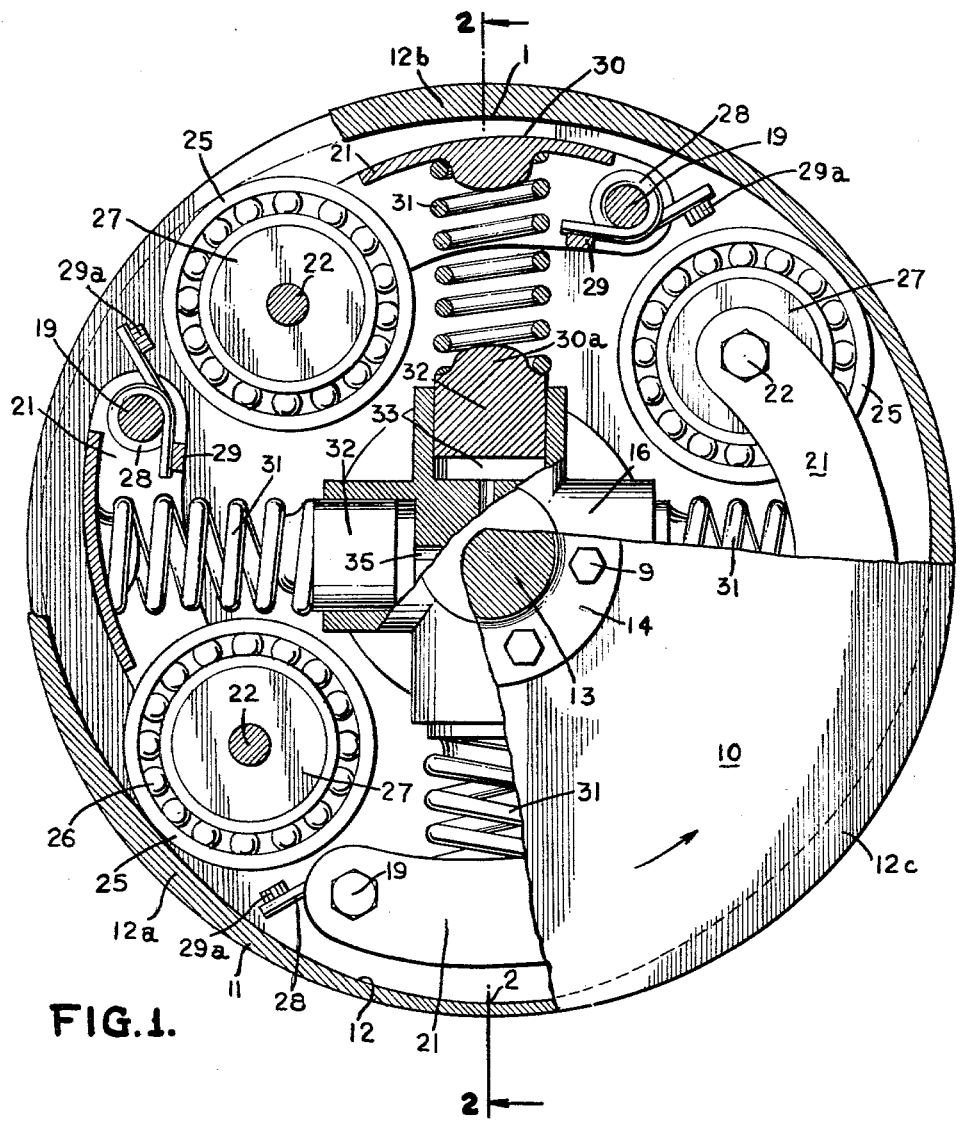
FIGURE 1 is an elevational view, partly in section and taken along planes indicated by the broken line 1—1, FIGURE 2.

Referring in detail to FIGURES 1 and 2, a shaft 13 is connected to be driven by a prime mover such as the internal combustion engine of an automotive vehicle. The shaft terminates in a flange 14 which is fixed to a cylindrical, one-piece cam element or flywheel 10 comprising a circular plate secured by cap screws 9 to flange 14, coaxially of shaft 13. The cam element has skirt or rim portion 11 with cylindrical exterior surface. The rim varies in thickness or dimension radial of the axis of shaft 13 to form a plurality of lobes or cam risers 12 shown upon FIGURES 1 and 2 as three in number and identified respectively as 12a, 12b, and 12c, FIGURE 1. In other words, the inner surface of the skirt or rim is generated by the rotation about the axis of shaft 3, of a line parallel therewith, whose radial distance from said axis varies cyclically and uniformly from a minimum to a maximum. In the model shown this cycle repeats every 120° so that point 1, FIGURE 1, represents a minimum radial distance or what is the same thing, a maximum rim thickness, and point 2, FIGURE 1, a maximum radial distance, there thus being three equiangularly spaced points 1 hereinafter referred to as the "high" parts of the cam surface, and three equiangularly spaced points 2 termed the "low" parts of the cam. Thus a "low" part occurs midway between each two successive "high" parts.

A shaft 18 to be driven by shaft 13, is coaxial therewith, and has a keyed or splined connection with a one-piece hub 16 which, as indicated at FIGURE 2, has a reduced coaxial end 15 fitting corresponding axially-aligned holes in plate 10 and flange 14. A circular plate 17 is integral or integrally fixed with hub 16 and has a radius about the same as the external radius of element 10, and has its peripheral edge overlying and covering the free edge of rim 11.

In the model shown, hub 16 is shaped in the general form of a cross, as seen upon FIGURE 1, to form four equiangularly spaced radial arms. Each of these arms has therein a radial bore 33 forming a cylinder for pressure fluid, as and for a purpose subsequently described.

Plate 17 has on its inner face four equiangularly spaced lugs, one of which is indicated at 20, FIGURE 2. Each of four bearing pins 19 has one end fixed in each respective lug, to extend in parallel, radially-offset relation with the common axis of shafts 13 and 18. Each of four identical levers or rocker arms 21 has one end journaled upon a respective one of bearing pins 19 for limited pivotal movement in a common plane normal to the axis of shafts 13 and 18. The arms are all duplicates and from FIGURE 1 it is noted that they are arcuate in the aforesaid plane and, from FIGURE 2, that they are in the general form of channels over a portion of their lengths extending from pivot shaft 19. The remaining length of each arm has the bottom of its channel cut away to form parallel spaced mounts for a roller 25 at its free distal end. Each roller is mounted as by means of a bearing pin 22 fixed with its arm, and includes a hub and inner race 27 and a plurality of anti-friction balls 26. The roller itself conveniently forms the outer race, so that each is journaled for free rotation on its respective pin 22. Thus each roller is free to roll in contact with the inner or cam surface of skirt 11 as its respective arm 21 pivots about its bearing pin 19.

Referring to the top portions of FIGURES 1 and 2, it is noted that each rocker arm 21 has a lug or protrusion 30 between its ends and extending radially inwardly from the base of its channel-shaped section. Each lug is sized to fit snugly within the radially-outward end of a respective one of four coil compression springs 31. Each arm 21 is continuously urged into counterclockwise pivoting about its pivot pin 19, as viewed upon FIGURE 1, by a coil spring 28 which surrounds the pin and has its ends bearing against a first lug or abutment 29a fixed to the inner surface of plate 17, and a second lug 29 integral with the arm adjacent its pivoted end. Thus each roller is continuously urged to a position out of contact with rim or skirt 11 when the parts are at rest or have a force acting radially outwardly thereon below a certain minimum.

The four radial cylindrical bores in cross-shaped hub 16 have been previously mentioned. Each bore has a piston 32 slidably fitting therein. Each piston has a reduced radially-outward end fitting the radially-inward end of a respective one of compression coil springs 31 so that, when a force is applied to each piston moving it outwardly in its bore, the corresponding spring 31 is increasingly tensioned to pivot its arm 21 clockwise as viewed upon FIGURE 1, and thus force its roller 25, with variable force, into contact with rim 11.

Hub 16 is drilled axially, as at 36, FIGURE 2, and radial bores 35 extend from the inner end of bore 36 to each of the cylinder bores in the hub.

Referring to FIGURE 2, shaft 18 has a circumferential channel in a portion exterior of hub 16, and an axial bore 37 extending from its inner end in alignment and communication at its contiguous end with bore 36. A plurality of radial bores 38 in shaft 18 extend from the bottom of channel 45 to bore 37. A stationary gland or collar 42 surrounds shaft 18 in position over channel 45 therein and has a radial bore 39 in communication at its inward end with channel 45. Means not shown are provided to effect a pressure-tight oil seal between shaft 18 and the gland 42, at each side of channel 45.

A tubular connection identified generally at 41, FIGURE 2, enables the application of pressure to bore 39, from a pump diagrammatically indicated at 40. Likewise a pressure control valve 43 is in communication with connection 41, over a branch pipe 44.

Thus as oil is supplied under pressure from pump 40, all pistons 32 are forced radially outwardly, each in its respective cylindrical bore in hub 16, and all four springs 31 are thereby compressed to urge rollers 25 into contact with rim 11. The force with which each roller is urged into contact with the rim will, of course, be proportional to the effective oil pressure from pump 40 or, what is the same thing, to the radial outward displacement of pistons 32. If pump 40 is a constant pressure type, the effective pressure upon pistons 32 may be varied manually or automatically, as subsequently described, by control of valve 43 which, it will be understood, is connected with a reservoir or sump from which oil is drawn by pump 40.

It will be noted that the number of rollers 25 is different from the number of cam risers on rim 11. In the model illustrated there are four rollers and three cam risers. The number may vary so long as they are not equal, but the numbers shown in the model illustrated are presently preferred by me as giving satisfactory service in automotive and industrial drives, for example.

The operation of the species of FIGURES 1 and 2 will be generally clear from the preceding description. Normally, that is, when the engine or other prime mover connected to shaft 13, is idling and no power is required, springs 28 will rotate arms 21 to their radially-inwardmost positions wherein rollers 25 are just out of contact with cam surface 12 and pistons 32 are likewise in radially-inwardmost positions. With pump 40 in operation and the engine delivering sufficient power, the operator actuates valve 43 to partially close the same. This causes a build-up of pressure within passageways 35 and urges each piston with equal force, radially outwardly, so that rollers 25 are yieldingly urged into engagement with cam surface 12, with controlled force.

At first, with shaft 18 at rest, there will be twelve impulses applied to shaft 18 as each riser of the cam surface passes over and in contact with each roller. These impulses are caused, in an obvious way by the fact that as any given cam riser passes in contact with a roller, the latter is cammed slightly radially inwardly against the tension of its spring, thus creating a resistance having a force component tangential of a circle through bearing pins 19. The total power transmitted is thus the time integral of each impulse multiplied by the total number of impulses per unit time. Since the number is relatively large, a correspondingly large power may be transmitted which, to a certain degree, will depend upon the constants of the machine such as the rates of springs 31, plus the fluid pressure applied.

As shaft 18 picks up speed, centrifugal forces come increasingly into effect proportional to $$\frac{W}{g} \times \frac{V^2}{R}$$

where W is the effective mass of each roller and arm assembly, V is the linear speed of the centroid of the assembly, and R the radius of rotation thereof. Thus, while the number of impulses of cam surface 12 upon rollers 25 decreases as shaft 18 approaches synchronous speed the centrifugal force urging each roller outwardly also increases so that the summation of the aforesaid tangential forces, for unit time, may increase. Depending upon the power requirements of shaft 18, at some particular speed, these centrifugal forces, augmented by the thrust of springs 31 under fluid pressure from pistons 32, will be sufficient to bring shaft 18 up to synchronous speed, with one roller 25 at, or closely adjacent, a "low" point on the cam surface.

If the resistance or power requirements of shaft 18 increase, so that it slows down relatively to shaft 13, the impulses resume and the device automatically adjusts itself to the power applied to shaft 13; and it may be again brought to synchronous speed by an increase in engine speed and/or an increase in fluid pressure effective on pistons 32, as by a further restriction of fluid flow through valve 43.

FIGURE 3 depicts a form of the invention having embodied therein an automatic speed control. In this modification all parts may be the same as those described in connection with FIGURES 1 and 2 and have therefore been identified by the same reference numerals and need not be described in detail.

Driven shaft 18 has a pinion 47 fixed thereon and in mesh with a second pinion 48, in turn fixed to a shaft 49 driving a speed-responsive device 50. Although device 50 is shown as of the flyball type, it will be understood that any other known type of device responding to the speed of rotation of shaft 18, may be substituted. As shown, upon increase of speed of rotation of shaft 18 and, hence, of device 50, a channeled collar 51 rotatable as a unit with shaft 49, is translated to the right, as viewed upon the figure, carrying with it the contiguous end of a lever 52, fulcrumed at 53 to any convenient part of the frame, not shown.

The tubular connections leading to the radially-inward ends of the cylindrical bores 33 in hub 16 may be as previously described in connection with FIGURES 1 and 3 and are similarly identified. However, by-pass pipe 44 has therein a valve 54 which has its movable element 55 connected with the second end of lever 52 and is, in a way obvious from inspection of the drawing, moved in the valve-closing direction by and proportionally in response to increase in speed of shaft 18.

A pipe or conduit 56 connects the discharge side of valve 54, with manual pressure control valve 43 also shown upon FIGURE 2.

Due to connections shown, an increase of speed in driven shaft 18 results in a corresponding closure of valve 54, with a resulting increase of pressure of fluid effective upon pistons 32 and a corresponding increase in the compression of springs 31 and the force with which each urges its roller 25 into contact with cam surface 12.

The operation of the species of FIGURE 3 is basically like that of FIGURES 1 and 2 except that the fluid pressure applied to pistons 32 is automatically increased or decreased, with corresponding increase or decrease, respectively, in the speed of shaft 18.

Figure 4:
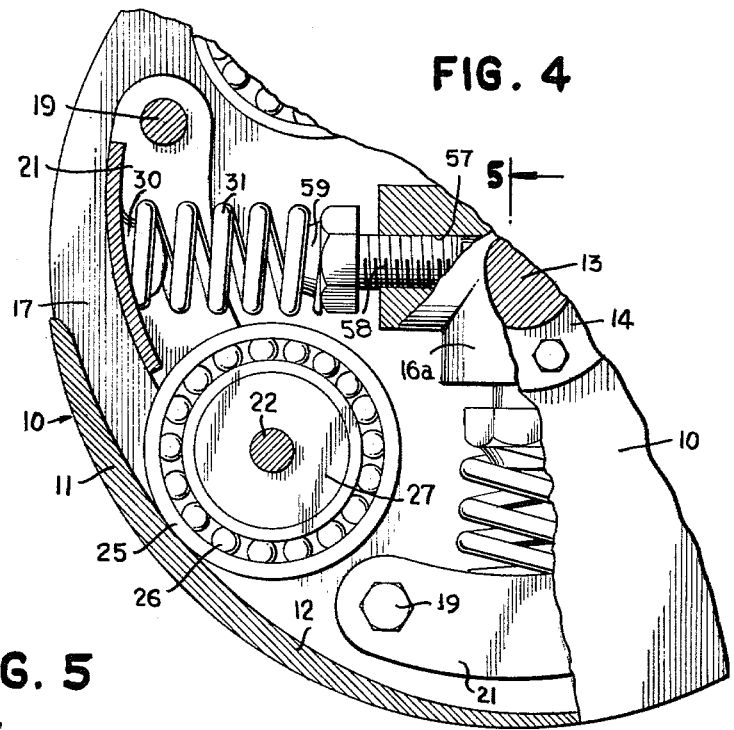
FIGURE 4 is a partial sectional view of another modification and taken in a plane identified by line 4—4, FIGURE 5.
Figure 5:
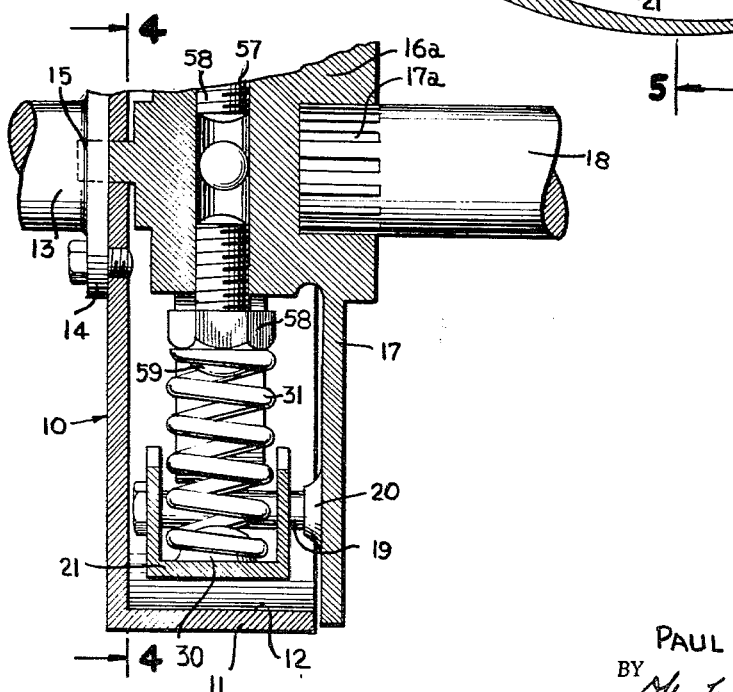
FIGURE 5 is a partial section taken in a plane identified by line 5—5, FIGURE 4.

In the modification of FIGURES 4 and 5, cam element 10, drive shaft 13, driven shaft 18, rocker arms 21, springs 31, etc., may be the same as in the species of FIGURES 1, 2 and 3 and, being identified by the same reference numerals as in those figures, need not be described in detail.

In the modification being described, however, the hydraulic pressure control means are omitted so that hub 16a, while being connected with shaft 18 by splines 17a, and of the same general cross shape, has four threaded apertures 57 with the axes of each two opposed apertures in alignment and the two axes thus defined mutually normally and in a common plane normal to the common axes of shafts 13 and 18.

Four cap screws 58 are threaded each into a respective one of apertures 57. These cap screws are all duplicates and each has a lug 59 integral with and extending axially outward from its head, to fit snugly within the radially inward end of a respective one of the four springs 31 which may be as previously described, with its radially outward end snugly fitting over the lug 30 of a respective one of rocker arms 21. Thus, in a way obvious from inspection of FIGURES 4 and 5, each cap screw may be turned to vary in a precise way, the force with which its spring urges the corresponding roller 25 into engagement with the cam surface of element 10. It is noted that in this species the torsion springs such as 28, are omitted. Suitable means, not shown, are provided to lock each cap screw in its position of rotative adjustment. Such means, for example, might take the form of a single wire passing through diametral holes in the head of each screw and having its ends twisted together.

The operation of the modification of FIGURES 4 and 5 is basically the same as that of FIGURES 1, 2 and 3, except that no hydraulic pressure control is provided. This form of the invention will be particularly useful in industry, to connect a prime mover with a piece of machinery to be driven thereby. For example, it could be used to connect an electric motor to an air or refrigerant compressor, where the motor must start under load. In such an installation shafts 13 and 18 could be directly connected with the motor and compressor, respectively.

On starting the motor, cam element is driven at synchronous speed and rollers 25 simply roll over cam surface 12. However, the impulses transmitted to these rollers and through arms 21 to hub 16a, create a driving torque upon shaft 18 causing it to pick up speed. With the drive properly proportioned to the maximum power to be transmitted, and the initial tension of springs 31 properly adjusted, the increasing centrifugal force acting upon each roller and arm assembly as shaft 18 picks up rotational speed will result in an increase in the tangential torque component of each impulse until the component of one roller within a "low" point 2 of the cam surface 12, will be sufficient to connect shafts 13 and 18 for synchronous rotation. If the load upon driven shaft 18 increases, rollers 25 will again start to roll slowly over and along cam surface 12 until the torque input is again sufficient to overcome the increased load.

Thus the invention will effect an automatic adjustment to any speed and load, so that it may replace reduction gears and other forms of complicated variable-speed drives. Because of its impositive connection between the driving and driven shafts, the invention also acts as a safety device, as in the case of a slug of liquid refrigerant being drawn into the compressor, jamming of parts of the driven machine, etc. Unlike konwn safety clutches, however, it is virtually frictionless and instantaneous in its release action. Furthermore, in such cases, since there is nothing to shear or be broken, the converter is ready for instant use once the trouble has been obviated.

What is claimed is:

1. In a torque converter, a driving shaft, a driven shaft, said shafts being journaled in end-to-end relation for rotation about a common axis, a rigid cam surface extending continuously about said axis in a plane normal thereto, said surface being generated by the rotation at constant speed about said axis, of a line of fixed length parallel with and radially offset from said axis, while uniformly varying the radial distance of said line through a whole number of cycles, greater than one, between predetermined minimum and maximum radial distances, to define a corresponding number of cam lobes, a plurality of cam followers, means mounting said followers on said driven shaft for rotation as a unit therewith and for motion relatively thereto, radially of said axis, and means operable to yieldingly urge said followers radially of said axis, into contact with said cam surface, with variable force, the number of said cam lobes being three, and the number of said cam followers being four, said cam surface being formed on the interior surface of a cylinder fixed to said driving shaft coaxially of said axis and having an open end, said mounting means comprising a hub connected for rotation as a unit with said driven shaft and having four equiangularly-spaced radial cylinder bores, four pistons each fitting a respective one of said bores, four compression springs each acting between a respective one of said pistons and a corresponding one of said cam followers, and hydraulic fluid pressure means connected with a common circuit in said hub to all said bores and operable to controllably vary the force with which each said spring urges its follower into contact with said cam surface.

2. In a torque converter, a driving shaft, a driven shaft, said shafts being journaled in end-to-end relation for rotation about a common first axis, a hollow cylindrical element fixed to said driving shaft symmetrically about said axis, said element having its interior side wall surface formed as a cam surface generated by the rotation at constant speed about said axis, of a line of fixed length, parallel with and radially offset from said axis, while varying cyclically and uniformly the radial distance of said line, from said axis, between predetermined minimum and maximum distances, the number of cycles per 360° rotation of said line being a whole number greater than one, an integral hub and plate fixed to said driven shaft, there being a plurality of bores in said hub radially of and equiangularly spaced about said axis, a plurality of arms each having one end mounted to said plate for pivoting about a respective second axes parallel with and radially offset from said first axis, each said second axis being parallel with said first axis in equiangularly-spaced relation thereabout, a plurality of members each mounted in a respective one of said bores for radial adjustment therealong, a plurality of antifriction rollers each mounted on the other end of each said respective arm for movement into contact with said cam surface, and a plurality of compression springs, each engaging at one end a respective one of said members and a corresponding one of said arms, between its ends, and means operable to radially adjust said members to vary the force with which said springs urge each said roller into contact with said cam surface.

3. The torque converter of claim 2, the number of said cycles being three and the number of said arms, bores, members and springs being four, each said member comprising a piston slidably fitting its bore, and hydraulic pressure means connected with the radially-inward ends of all said bores and operable to force each said piston radially outwardly, to vary the force with which each spring urges its roller into contact with said cam surface.

4. The torque converter of claim 3, said hydraulic pressure means including a valve manually operable to vary the radial position of each said piston in its bore.

5. The torque converter of claim 3, said hydraulic pressure means including a valve operable to vary the radial position of said pistons within said bores, and means responsive to the speed of rotation of one said shaft, to correspondingly adjust the effective pressure of fluid applied to said pistons.

6. The torque converter of claim 2, each said member comprising a screw threaded into its bore and having a radially-outward head engaging the radially-inward end of a respective one of said springs, each said screw being turnable to adjust the radially outward thrust of its spring.

7. The torque converter of claim 2, and spring means urging each said arm into pivotal movement to move its roller out of contact with said cam surface when the combined radially outward force on each said roller, due to centrifugal force and the thrust of its spring, is below a predetermined minimum.

8. A torque converter comprising a driving member, a driven member, a plurality of cam surfaces carried by one of said members, a plurality of cam followers carried by the other said members, adjustable means for urging the followers into engagement with the cams, spring means for urging the followers away from the cams, and means for adjusting said adustable means to urge the followers into engagement with the cam surfaces with selected force.

9. A device as in claim 8 wherein the adjustable means comprises a spring, and fluid operated means for adjusting the bias of the spring.

10. A device as in claim 9 wherein the fluid operated means comprises a cylinder, a piston in the cylinder, a source of constant pressure fluid, means for reducing the pressure, and means for delivering the reduced pressure to the cylinder.

11. A device as in claim 10 further including means responsive to the speed of the driven shaft for varying the pressure of the fluid supplied to the cylinder.

References Cited by the Examiner

UNITED STATES PATENTS

| | | | |
|---|---|---|---|
| 924,749 | 6/09 | Draper. | |
| 1,703,061 | 2/29 | Coleman | 74—64 |
| 1,865,559 | 7/29 | Montgrand | 74—64 |
| 2,167,276 | 7/39 | Harmon | 74—64 |

FOREIGN PATENTS

| | | |
|---|---|---|
| 50,951 | 2/41 | France. |
| 964,732 | 2/50 | France. |

BROUGHTON G. DURHAM, *Primary Examiner.*